(12) United States Patent
Partington

(10) Patent No.: US 12,227,311 B2
(45) Date of Patent: Feb. 18, 2025

(54) ANTI-GRAVITY DRIVE

(71) Applicant: Jeremy Matthew Partington, Pakenham (AU)

(72) Inventor: Jeremy Matthew Partington, Pakenham (AU)

( * ) Notice: Subject to any disclaimer, the term of this patent is extended or adjusted under 35 U.S.C. 154(b) by 772 days.

(21) Appl. No.: 17/269,585

(22) PCT Filed: Jul. 18, 2019

(86) PCT No.: PCT/AU2019/000097
§ 371 (c)(1),
(2) Date: Feb. 19, 2021

(87) PCT Pub. No.: WO2020/037352
PCT Pub. Date: Feb. 27, 2020

(65) Prior Publication Data
US 2021/0309394 A1 Oct. 7, 2021

(30) Foreign Application Priority Data
Aug. 19, 2018 (AU) ................ 2018903042

(51) Int. Cl.
*B64G 1/28* (2006.01)
*B64G 1/24* (2006.01)
(Continued)

(52) U.S. Cl.
CPC ............... *B64G 1/28* (2013.01); *B64G 1/242* (2013.01); *B64G 1/409* (2013.01); *B64G 1/646* (2013.01); *F03G 3/00* (2013.01); *B64G 1/443* (2013.01)

(58) Field of Classification Search
CPC .......... B64G 1/242; B64G 1/244; B64G 1/28; B64G 1/34; B64G 1/409; B64G 1/10; B64G 1/222
See application file for complete search history.

(56) References Cited

U.S. PATENT DOCUMENTS 3,532,298 A    10/1970   Swet
3,868,072 A *   2/1975   Fogarty ................. B64G 1/409
                                                              244/167

(Continued)

OTHER PUBLICATIONS

Landis, G., "Satellite Relocation by Tether Deployment", 1 Journal of Guidance and Control and Dynamics, Jan. 1, 1991 AIAA, Reston, VA, US—ISSN 0731-5090, vol. 14, Nr:1, pp. 214-216.
(Continued)

*Primary Examiner* — Philip J Bonzell
*Assistant Examiner* — Colin Zohoori
(74) *Attorney, Agent, or Firm* — David Guerra

(57) ABSTRACT

An apparatus comprised of positionally directable masses attached to a binding component that includes a coupling device for payload to reduce gravitational deviation of the apparatus' trajectory by alternatingly accelerating and retracting physically bound component masses in equal and opposite directions to the extents of their bindings, initially and optimally perpendicular to the gravitational field and perpendicular to the apparatus trajectory by using in built transduction componentry located within the masses or the binding componentry or both that utilises electromagnetic forces, forces generated by chemical reactions, or other applied or responsive motive force to positionally direct the bound directable masses.

15 Claims, 9 Drawing Sheets

(51) Int. Cl.
 *B64G 1/40* (2006.01)
 *B64G 1/44* (2006.01)
 *B64G 1/64* (2006.01)
 *F03G 3/00* (2006.01)

(56) References Cited

U.S. PATENT DOCUMENTS

| | | | | |
|---|---|---|---|---|
| 5,082,211 | A * | 1/1992 | Werka | B64G 1/1078 |
| | | | | 244/167 |
| 6,419,191 | B1 * | 7/2002 | Hoyt | B64G 1/40 |
| | | | | 244/166 |
| 7,503,526 | B1 * | 3/2009 | Taylor | B64G 1/648 |
| | | | | 244/172.4 |
| 2009/0188346 | A1 | 7/2009 | Hampton | |
| 2010/0193640 | A1 * | 8/2010 | Atmur | B64G 1/242 |
| | | | | 244/158.2 |
| 2014/0107865 | A1 * | 4/2014 | Griffith, Sr. | B64G 1/24 |
| | | | | 244/158.6 |
| 2024/0035458 | A1 * | 2/2024 | Nania | F03H 99/00 |

OTHER PUBLICATIONS

Landis, G., "Reactionless Propulsion Using Tethers", https://ntrs.nasa.gov/archive/nasa/casi.ntrs.nasa.gov/19910012850.pdf.

\* cited by examiner

GRAVITATIONAL STRENGTH

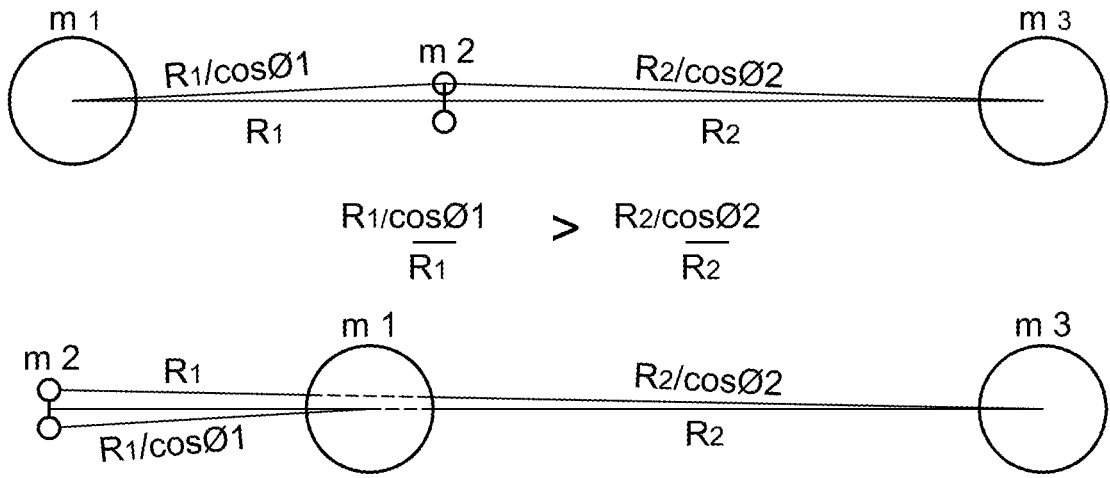
Figure 3
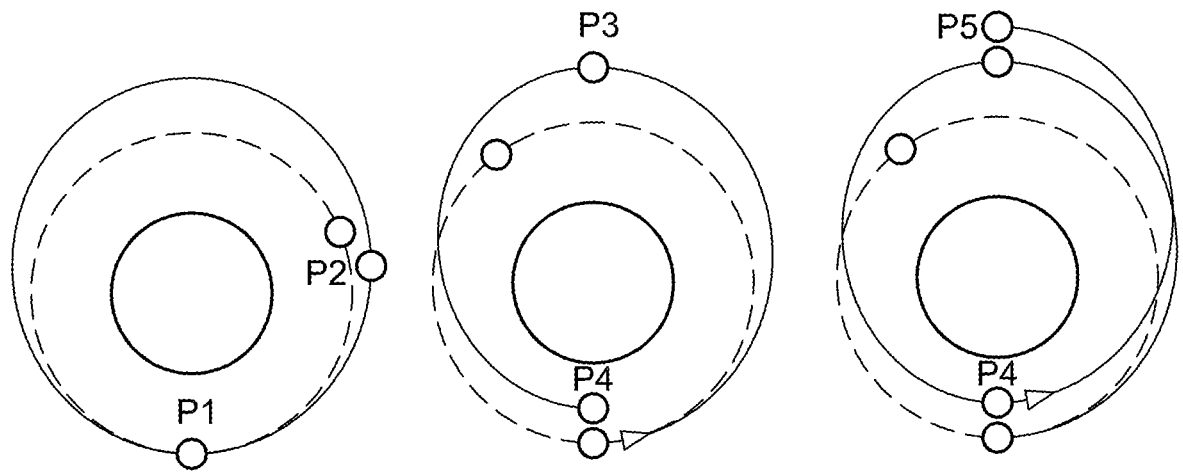
Figure 4i
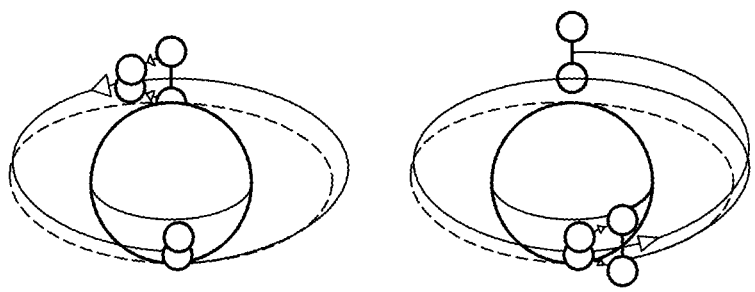
Figure 4ii　　　　Figure 4iii

Figure 5iii

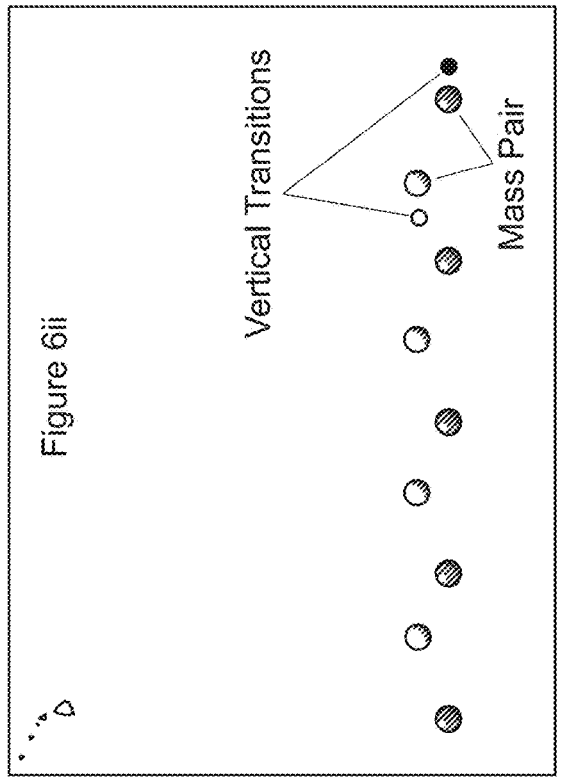
Figure 6ii
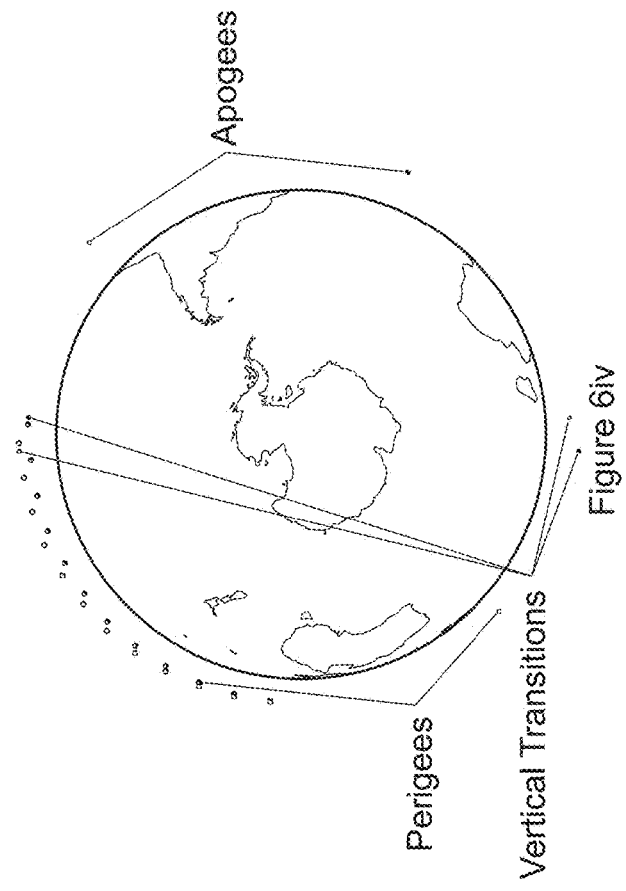
Figure 6iv
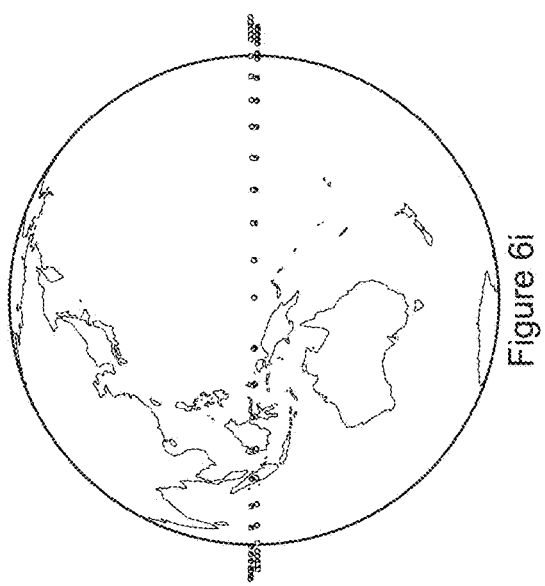
Figure 6i
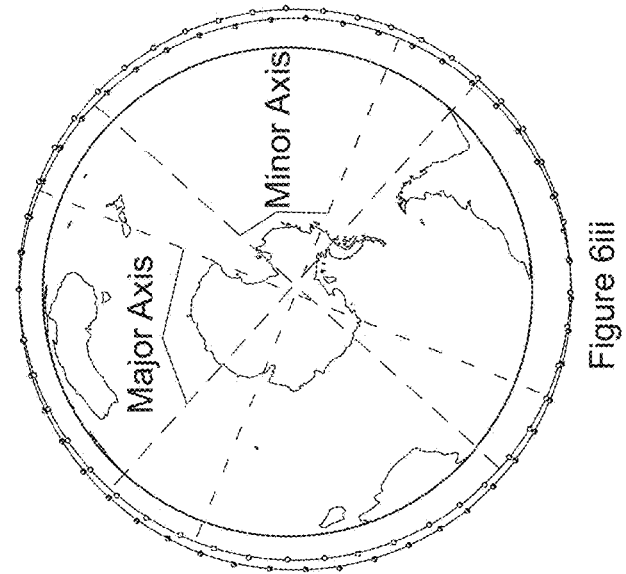
Figure 6iii Figure 10i-v:
EMBODIMENT 3 TIMELINE
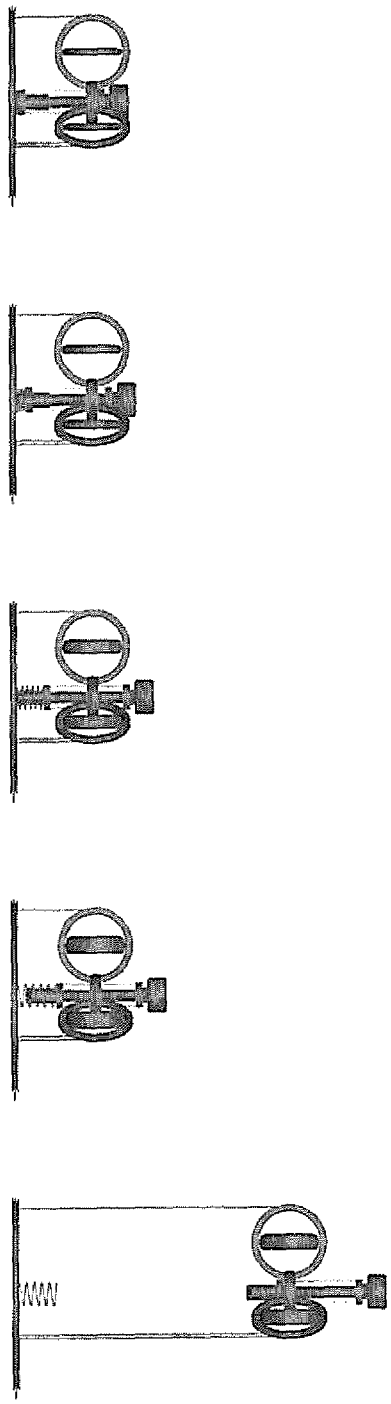
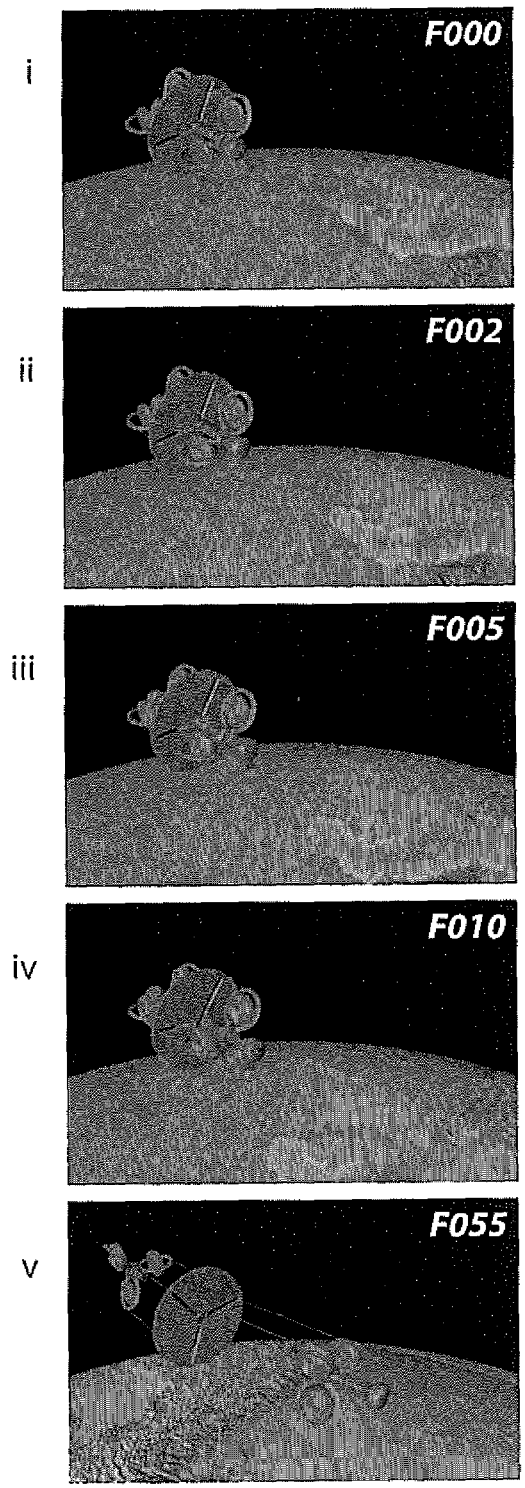

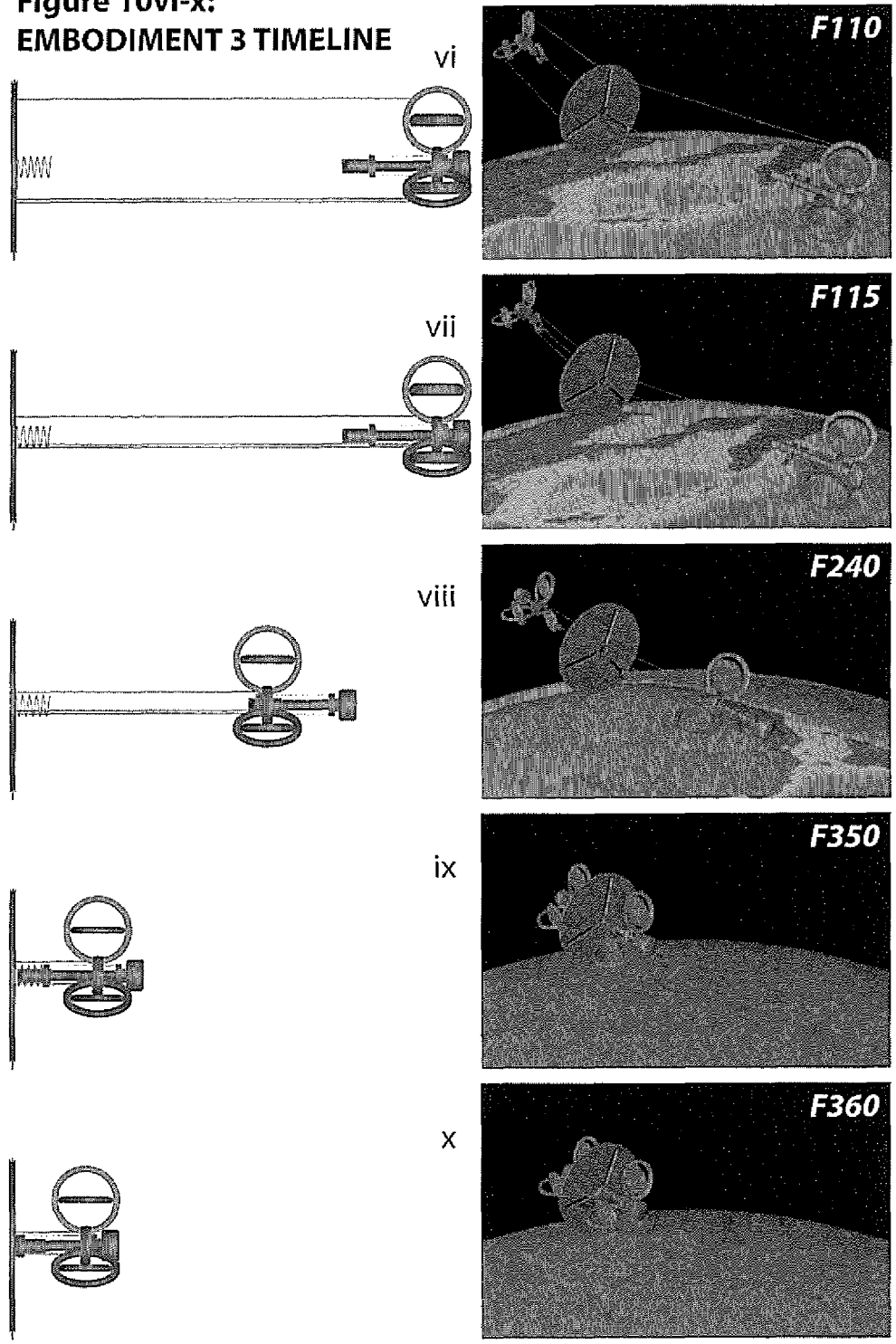
Figure 10vi-x: EMBODIMENT 3 TIMELINE

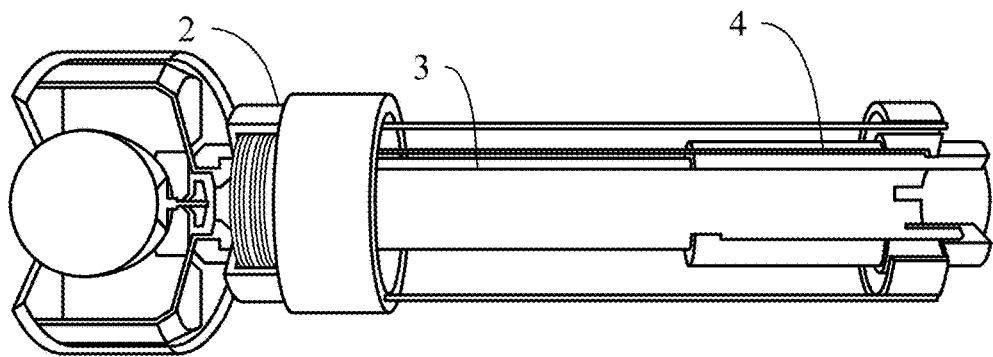
FIG. 11i
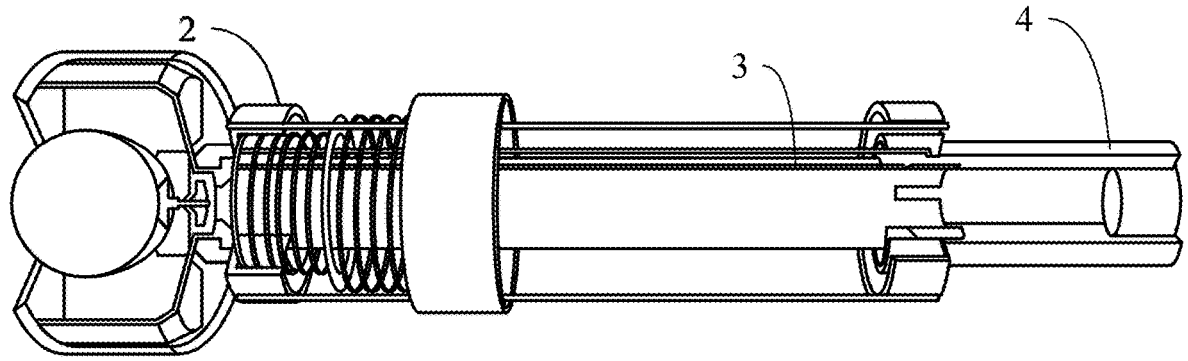
FIG. 11ii
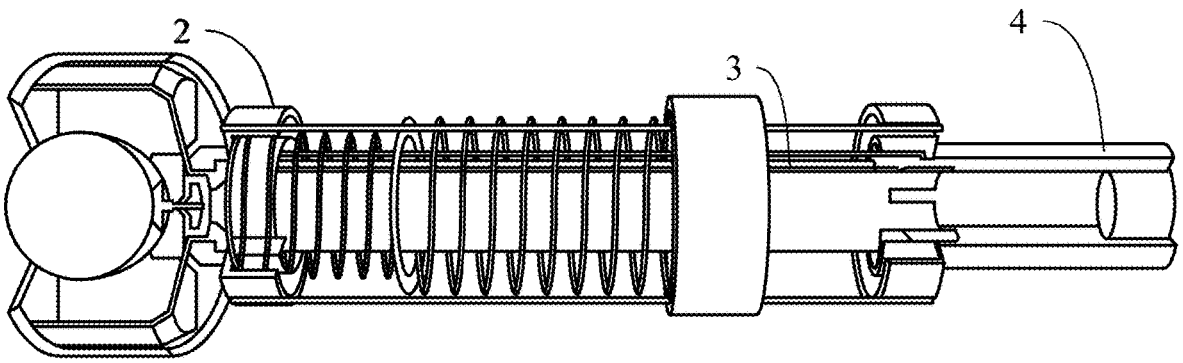
FIG. 11iii
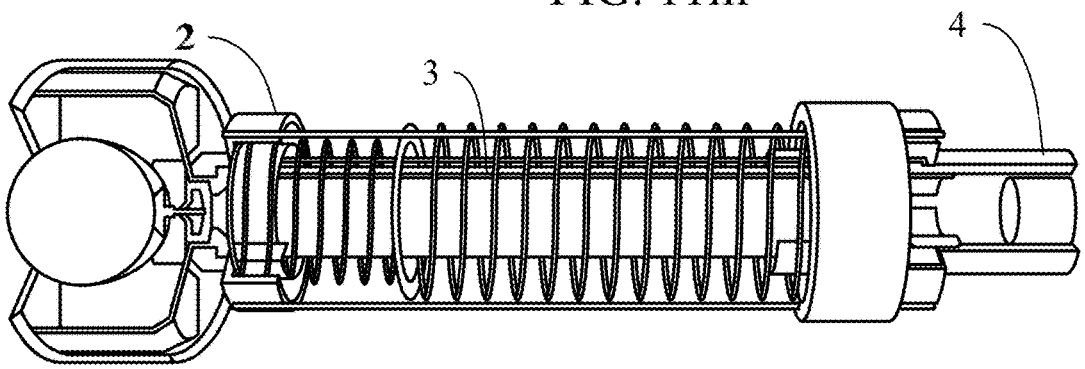
FIG. 11iv

ANTI-GRAVITY DRIVE

CROSS-REFERENCE TO RELATED APPLICATIONS

This application is an U.S. national phase application under 35 U.S.C. § 371 based upon co-pending International Application No. PCT/AU2019/000097 filed on Aug. 18, 2019. Additionally, this U.S. national phase application claims the benefit of priority of co-pending International Application No. PCT/AU2019/000097 filed on Aug. 18, 2019 and Australia Application No. 2018903042 filed on Aug. 19, 2018. The entire disclosures of the prior applications are incorporated herein by reference. The international application was published on Feb. 27, 2020 under Publication No. WO 2020/037352 A1.

BACKGROUND

Technical Field

The present technology relates to an orbital propulsion system and method for use in connection with utilizing mechanical energy exerted on constrained masses within gravitational fields to modify an initial trajectory of an apparatus, such as a spacecraft or payload assembly.

Background Description

Physics of Motion

For operation to gain altitude or lengthen orbit period, acceleration vectors are initially applied orthogonally to the orbital and gravitational direction to the masses, resulting in trajectories with less curvature than the orbital trajectory the masses were initially travelling along.

FIG. 1 of Drawing 1 shows the different trajectories the apparatus will travel on given the same initial velocity and vector. The two different trajectories depend on whether the masses are separated or not. The separation vectors both contain an "upward" component, allowing the masses to reach an altitude R/cos ø relative to R (higher).

The separation action of the masses adds kinetic energy to the apparatus which is subsequently transformed into potential energy (elevation). Kinetic energy is added to the apparatus irrespective of the equal and opposite directions the masses are separated along. The most practical direction to raise a payload is orthogonal to the orbital direction and the dominant gravitational vector. In this case, the orthogonality of the separation vectors is not absolute: as soon as separation commences, orthogonality relative to the gravitational vector disappears as soon as any distance is travelled and an "upwards" component of the trajectory appears, or more precisely, the apparatus accelerates less subject to gravity. The initial condition of this example is presumed to be a circular orbit.

The action of moving the masses in the effective directions increases and decreases gravitational proximity of the apparatus (FIG. 2).

Once the energy of acceleration is applied, the masses move along their new trajectory, which gains altitude relative to the main gravitational mass. The force of gravity diminishes relative to the elevation gained, but because the gravity vectors operating on the masses diverge, the "downward" gravitational force operating on the apparatus as a whole body is diminished further as the overall gravitational force is radially distributed on the apparatus over a larger sector. Tire amount by which the divergence of the gravitational vectors changes is trigonometrically linked to an amount of work done to elevate the masses. The separation action therefore requires energy to be invested and is subsequently stored as potential energy.

When separation occurs, the gravitational vectors influencing the masses individually change in strength and direction. The closest gravitational proximity is encountered when the two masses are as close as possible to each other. The maximum gravitational downward force acting on the center of mass/gravity of the apparatus is also experienced at this position. As the separation distance between the masses increases, the gravitational vectors acting on the two masses diverge and the overall downward force diminishes.

As an aside, if an object large enough to make a letter C or O around a gravitational body is placed in a stable gravitationally neutral position, gravitational vectors can be seen to be operating in opposite directions on such an object. A diverging gravitational field will apply compression to any two contacting particles or objects subject to the field. Separation creates more compression which lessens the overall downward force acting on the two objects along a line formed between the center of mass of the gravitational body and the apparatus.

Gravitational compression is the resultant physical force the present technology works to induce and oppose. The amount of gravitational compression induced or opposed is trigonometrically related to the vertical gravitational force operating on the apparatus through the center of mass.

Gravitational tension operates parallel with a gravitational field and also has an effect on the operation of the present technology. Gravitational tension operates between connected objects with differing altitudes relative to the gravitational field because the force of gravity is dependent on proximity Gravitational tension is observable when water flows from a tap as a laminar flow being broken into droplets. Gravitational tension also works in orbit by aligning objects with the gravitational field or by causing them to oscillate back and forth pendulum like around the gravitational vector. This type of motion is complex, dependent upon velocities, orbital period, altitude and the overall length of the tensile system under being inspected. Gravitational tension generated by the present technology can be used to reduce velocities when divergent trajectories of bodies are made to oppose each other.

In addition to diminishing the effective downward gravitational force of the dominant gravitational body, the separation action also causes the influence of a secondary gravitational field to become proportionally stronger relative to the dominant gravitational field due to the change in relative gravitational proximity (FIG. 3, drawing 2).

The theoretical simplified gravitational model that excludes secondary gravitational bodies sees the apparatus enter a more elliptical orbit than the initial trajectory when the masses are separated. If the masses are retracted to their original position after one or more complete orbits, the apparatus will re-enter its original orbit and trajectory. The potential energy of raising the masses is returned and energy is conserved.

SUMMARY

The orbital propulsion system and method of the present technology utilizes mechanical energy exerted on constrained masses within gravitational fields to modify the initial trajectory of the apparatus. These two masses are tethered or otherwise constrained, so remain attached and part of the physical body of the apparatus, but are permitted to travel in the required directions. When referring to the two masses, these can be two single masses, two groups of masses, or separate component assemblies with or without payloads, the important distinction is that they are directed in overall opposite directions as the primary function. Most of the main components of the apparatus are designed to provide the constrained motion of the propellable masses. A coupling is required to effect trajectory manipulation of a payload, this coupling assembly will be located in the center of the apparatus if minimal accelerative forces are required. Tire central load can be minimized by limiting central componentry to the mass constraining device by incorporating all other componentry and any payloads with the propellable masses. Minimizing the central load of the apparatus maximizes performance.

For the purpose of explanation, the force action applied to the two masses is equal and opposite. It is possible to propel the propellable masses in directions with vector components aligned or unaligned with the apparatus trajectory if the central load is included in the force action. Regardless of the number of components interacting, initial momentum is conserved. Operation to manipulate the orbital plane of the apparatus requires the directed mass vectors to be directed into asymmetrical orbital planes, resulting in asymmetric gravitational forces.

Operation to descend require downwards and/or backwards components to be applied to one of the directed mass vectors.

Operation to affect rotational motion requires the masses to be travelling in different directions relative to each other offset such that a rotational moment between the masses is created, enlarged or negated either partially or fully.

The quantity of mass should be close to balanced in either direction, however, variance of the quantity of mass may be used for directional control. In operation, there may be an exchange of mass between the two masses or other elements of the apparatus for directional control.

An apparatus constructed for space travel comprising positionally propellable masses physically constrained by binding mechanisms attached to an assembly of components that incorporates coupling device/s for payload/s, reaction motor/s or reaction inducer/s, gyroscope/s energy storage and mechanism/s and/or equipment that; provide control to and the application of force to the propellable masses and to control other componentry determinative to the operation of the apparatus to; alter the spatial mass distribution of components to reduce gravitational deviation of the apparatus trajectory for the purpose of providing a resultant propulsive force to elements of the componentry and coupled payload/s or other objects by; accelerating the physically constrained propellable masses in directions precisely determined by controlled gyroscopic action of gyroscope/s and/or reaction motors and/or reaction inducers controlling the initial attitudinal orientation of the mass directing mechanism/s and propellable masses towards the outer extents of their constraints, initially and optimally perpendicular to the gravitational field or in a combination of directions that account for/interact with the other elements of the apparatus by; using inbuilt transduction componentry located within the masses or other apparatus componentry that utilize electromagnetic forces, forces generated by chemical reactions, or other applied, induced or responsive physical motive or demotive force to; positionally direct the constrained propellable masses to determined positions or regions that reduce the gravitational deviation of the apparatus trajectory.

An apparatus that directs constrained component masses towards locations that increase gravitational deviation of the apparatus trajectory for the purpose of; restoring the initial state of the apparatus that experiences increased gravitational deviation or to create a state of increased gravitational deviation by; accelerating the physically constrained propellable masses in directions towards the inner extents of their constraints by; using in built transduction componentry located within the masses or other apparatus componentry that utilize electromagnetic forces, forces generated by chemical reactions, or other applied, induced or responsive physical motive or demotive force to; positionally direct the constrained propellable masses to determined positions or regions that increase the gravitational deviation of the apparatus trajectory.

An apparatus that can maneuver to traverse through a possible range of trajectories by; directing physically constrained component masses towards locations or regions where disproportionate gravitational deviative forces cause disproportionate inertial reactions of the masses that are applied to the apparatus to; alter the initial trajectory by decelerating the apparatus for the purpose of lowering velocity and/or causing the apparatus to enter trajectories that exist on different orbital planes than the initial trajectory.

An apparatus that can manipulate its orbital period by; directing physically constrained component masses towards locations or regions that; lengthen or shorten the orbital period of the apparatus in response to the inertia applied by the masses.

An apparatus that includes componentry to control and transfer mass between the constrained component masses or other elements of the apparatus by; incorporating a mass transfer system such as a fluid/gas pump/s and reservoirs or solid mass using positional componentry; to provide control over the velocity responses of the masses and the apparatus to the application of forces.

An apparatus that has affixed a payload coupling device/s consisting of high tensile strength cable and attached fixing mechanisms; to grasp a pay-load upon rendezvous and/or coupling devices to grasp a payload or other object upon rendezvous.

An apparatus that has affixed a payload decoupling device/s consisting of high tensile cable, possibly bearing interspersed magnetic and/or electromagnetic components; for the purpose of providing a physical path for a payload or other object to traverse and accelerate along through application of electromagnetic or other motive forces.

An apparatus that incorporates some of, or the entire apparatus and any other attached object/s with the exception of a con-strained propellable mass and any remaining affixed objects or elements of the apparatus to; replicate the behavior of the apparatus described in the above embodiments without the requirement of a centrally or similarly located componentry with the exception of the directed mass constraining componentry.

According to one aspect, the present technology can include an orbital propulsion system including a payload assembly configured to contain a payload. A pair of propellable masses can be couplable to the payload assembly and cyclically moveable in diverging and converging directions in relation to each other. A binding mechanism can be configured to physically constrain the pair of propellable masses. A mass directing mechanism can be configured to control an attitudinal orientation of the propellable masses. A control system can be configured to alter a spatial mass distribution of the propellable masses to reduce a gravitational deviation of a trajectory of the payload assembly for providing a resultant propulsive force to the payload assembly. The control system can be configured to accelerate the propellable masses in directions toward an outer extent of the binding mechanism, respectively, and to positionally direct the propellable masses to determined first positions or first regions that reduce the gravitational deviation of the trajectory of the payload assembly. The directions can be angled with a gravitational field of a gravitational body. The control system can be configured to accelerate the propellable masses in directions toward an inner extent of the binding mechanism to increase the gravitational deviation of the trajectory of the payload assembly for restoring an initial state of the payload assembly that experiences increased gravitational deviation or to create a state of increased gravitational deviation, and to positionally direct the propellable masses to determined second positions or second regions that increase the gravitational deviation of the trajectory of the payload assembly.

According to another aspect, the present technology can include a method of using an orbital propulsion system that utilizes mechanical energy exerted on constrained masses within gravitational fields to modify a trajectory of a spacecraft. The method can include the steps of directing a pair of propellable masses towards locations or regions where disproportionate gravitational deviative forces cause disproportionate inertial reactions of the propellable masses that are applied to a payload assembly of the spacecraft. The propellable masses can be physically constrained to each other by a binding mechanism. Altering an initial trajectory by decelerating the spacecraft for any one of or any combination of lowering velocity and causing the spacecraft to enter trajectories that exist on different orbital planes than the initial trajectory. Manipulating an orbital period by directing the propellable masses towards locations or regions that lengthen or shorten the orbital period of the spacecraft in response to the inertia applied by the propellable masses by any one of or any combination of: accelerating the propellable masses in directions toward an outer extent of the binding mechanism, respectively, wherein the directions being angled with a gravitational field of a gravitational body, and to positionally direct the propellable masses to determined first positions or first regions that reduce the gravitational deviation of the trajectory of the payload assembly; and accelerating the propellable masses in directions toward an inner extent of the binding mechanism to increase the gravitational deviation of the trajectory of the payload assembly for restoring an initial state of the payload assembly that experiences increased gravitational deviation or to create a state of increased gravitational deviation, and to positionally direct the propellable masses to determined second positions or second regions that increase the gravitational deviation of the trajectory of the payload assembly.

In some or all embodiments, the control system can include any one or any combination selected from the group consisting of a gyroscope configured to provide gyroscopic action, reaction motors, and reaction inducers, for controlling the attitudinal orientation of the mass directing mechanism and the propellable masses.

In some or all embodiments, the propellable masses can include a mass propelling device configured to accelerate the propellable masses toward the inner extent of the binding mechanism. The mass propelling device can be selected from the group consisting of a transduction component, an electromagnetic force component, and a chemical reaction component configured to generate a propelling force.

In some or all embodiments, the binding mechanism can include a tether coupled to and extending between the propellable masses, and wherein the tether is extensible and retractable.

In some or all embodiments, the binding mechanism can be one or more cables windable about a real assembly associated with each of the propellable masses. The real assembly can be configured to wind in or let out the cables, respectively.

In some or all embodiments, the payload assembly can include slots configured for passage of at least one of the cables therethrough.

In some or all embodiments, the propellable masses can each include a reel assembly rail slidably associated with the reel assembly, with the propellable masses can each be mounted to the reel assembly rail, respectively.

In some or all embodiments, the reel assembly rail can include a projectile configured to be propelled toward the reel assembly and to accelerate the propellable masses in the directions toward the outer extent of the binding mechanism.

In some or all embodiments, the payload assembly includes a tail force absorber assembly can be configured to absorb an impact force of the reel assembly rail.

In some or all embodiments, the reel assembly can include a photovoltaic collector.

In some or all embodiments, the photovoltaic collector can be associated with a panel revolveable within the reel assembly, and the panel can include a condenser on a side opposite the photovoltaic collector. The condenser can be configured to radiate heat resulting from a mass propelling device of the propellable masses.

Some or all embodiments of the present technology can include a mass transfer system configured to control and transfer mass between elements of the orbital propulsion system to provide control over velocity responses of the propellable masses and the payload assembly to an application of forces. The mass transfer system can be selected from the group consisting of a fluid pump, a gas pump, moveable reservoirs, and a moveable solid mass.

In some embodiments, the binding mechanism can include any one of or any combination of interspersed magnetic components and interspersed electromagnetic components for providing a physical path for a payload or other object to traverse and accelerate therealong through application of a motive force.

Some or all embodiments of the present technology can include a payload coupling device including of high tensile strength cable and an attached fixing mechanism configured to grasp a payload upon rendezvous.

Some or all embodiments of the present technology can include the step of transferring mass between elements of the spacecraft utilizing a mass transfer system selected from the group consisting of a fluid pump, a gas pump, moveable reservoirs, and a moveable solid mass.

BRIEF DESCRIPTION OF THE DRAWINGS

The present technology will be better understood and objects other than those set forth above will become apparent when consideration is given to the following detailed description thereof. Such description makes reference to the annexed drawings wherein:

FIG. 3 is a graphical representation of a separation action causing the influence of a secondary gravitational field to become proportionally stronger relative to the dominant gravitational field due to the change in relative gravitational proximity.

FIG. 4i is a representational view of the retraction action can be made to restore the original trajectory with a return of the initial separation energy investment providing it occurs at position 1 (P1).

FIG. 4ii is a representational view of the retraction action between position 3 (P3) and 4 (P4).

FIG. 4iii is a representational view of the retraction action between position 5 (P5) and 6 (P6).

FIGS. 5i-v is a representational view of a motion simulation of an apparatus transitioning to an orbit of greater eccentricity and magnitude yields, and showing the relative positions at the end of the third orbit. FIG. 5i illustrates the mass separation. FIG. 5ii illustrates the orbital periods. FIG. 5iii illustrates the orbital periods angled view. FIG. 5iv illustrates the apogee elevation.

FIG. 6 is a representational view of a loss of velocity and a shift in the orbital plane upon retraction of the masses. FIG. 6i illustrates the orbital planes. FIG. 6ii illustrates the vertical transition interception. FIG. 6iii illustrates the vertical transitions. FIG. 6iv illustrates the major and minor axis.

FIGS. 10i-x are timeline representational views of the embodiment of the present technology in FIG. 9 in operation.

FIGS. 11i-iv are timeline representational views of the embodiment of the present technology in FIG. 9 in operation.

DETAILED DESCRIPTION OF THE EMBODIMENTS

Operation

Figure 1:
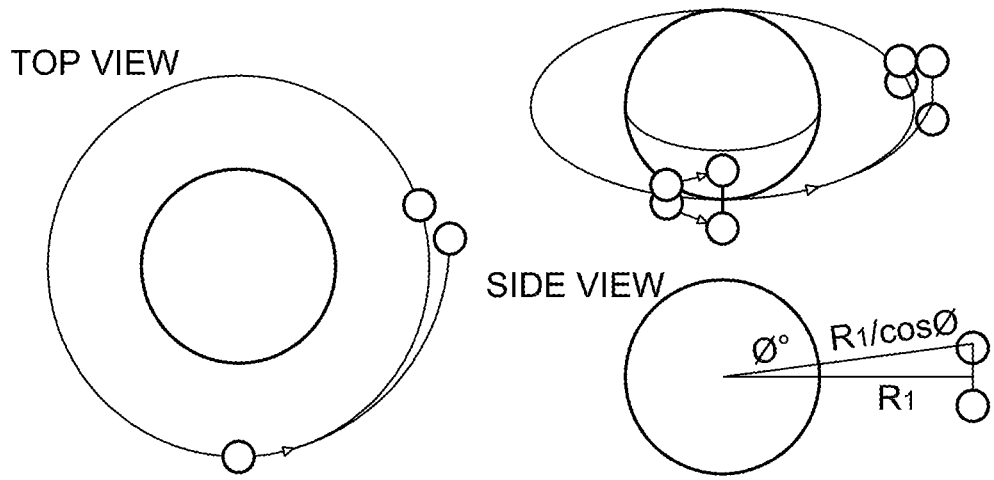
FIG. 1 is a representational view showing the different trajectories the apparatus will travel on given the same initial velocity and vector.
Figure 2:
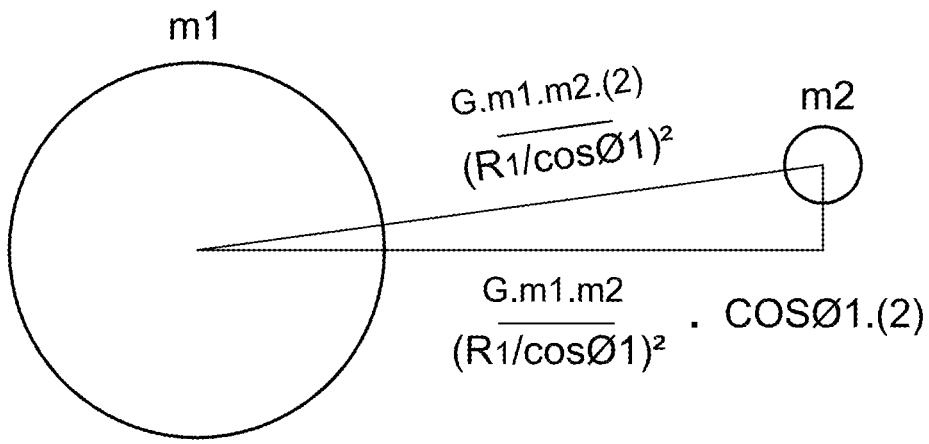
FIG. 2 is a graphical representation of an action of moving the masses in the effective directions increases and decreases gravitational proximity of the apparatus.

The energy of separation is stored within the gravitational system, materializing in a more elliptical orbit with less curvature than the original orbital trajectory. After any number of complete orbits, the retraction action can be made to restore the original trajectory with a return of the initial separation energy investment providing it occurs at position 1 (P1, FIG. 4i).

If the masses are retracted to their original position halfway through the orbit, less energy is available to be collected from what was expended by separating the masses because they "fall" through less gravitational height than they were "raised". The supplied energy from the apparatus power source is converted into kinetic energy, which is then converted into potential energy (altitude) as the masses become fully separated. As the gravitational vectors operating on the two discrete masses are not parallel, "raising" the masses requires work. The separation action partially opposes the gravitational force and directs some of this finite force to opposing the separation action and assisting the retraction action.

Implied within these force/energy exchanges is the capability to invest and return energy into modifying the trajectory of the apparatus.

As the masses transit along the intended trajectory during separation, they decelerate as an expected result of the gravitational field. If the retraction is conducted halfway through an orbit (P3, FIG. 4ii), it is occurring at the minimum velocity of the trajectory. The full overall "downward" force of gravity is restored at that time causing the trajectory to turn downward with a rapid increase in trajectory curvature followed by the apparatus being accelerated on a straightening trajectory downward towards the gravitational body and finally, the curvature and velocity rapidly increase as the apparatus moves toward a perigee (P4). The amount of energy not returned to the apparatus upon retraction remains as potential energy and is subsequently converted to kinetic energy as the apparatus accelerates towards the gravitational body. When the apparatus reaches its closest proximity to the gravitational body (P4, FIG. 4iii), it reaches its minimum potential energy and maximum kinetic energy for the elliptical orbit it is traversing at that time. This is the point in time when separating the masses will require substantial energy and will again modify the trajectory increasing eccentricity, allowing the apparatus to traverse to a higher apogee than the previous orbits (P5).

Repeating this process of separation and retraction transforms stored energy into kinetic and potential energy. In a simple gravitational system, the eccentricity can be modified until the trajectory leads to a collision with each iteration travelling greater (and shorter) distance from the gravitational body. In a simple gravitational universe, the solitary dominant gravitational body can never be escaped. However, the universe exerts a complex gravitational field. By aligning with secondary gravitational bodies, the apparatus is able to escape 'the dominant gravitational field by decreasing proximity relative to a secondary gravitational field until this secondary gravitational field becomes the dominant gravitational field (providing the trajectories aren't altered (atmospheric) or terminated by interactions with the dominant gravitational body).

The effectiveness of the action of directing the masses depends upon how much altitude is gained (or lost) by the masses. It is also dependent upon the initial altitude. Geometry dictates that with more altitude, a greater separation of the masses is required to achieve an equivalent incremental altitude gain.

The most effective operation would require an apparatus capable of very large separation distances. For an ideal embodiment, the separation and retraction of the masses is performed as quickly as possible. If the masses can reach a point where another gravitational field becomes more dominant, no further separation is required—the apparatus will accelerate to towards the secondary gravitational body.

If the masses are restored to their retracted positions after sufficient time has elapsed, they will be under the influence a new dominant gravitational field. However, because the initial dominant gravitational body is presumably within close proximity of the apparatus, the action of retracting the masses may place the apparatus back within the initial dominant gravitational field.

Linear Analogy

Translating the frame of reference to a linear context can provide a useful analogy to conceptualize how an increase in altitude is achieved. If gravitational control could be manipulated to a bouncing ball (or more specifically oscillating up and down), the ball could be made to travel higher if gravity is diminished. When the ball reaches the apex of its trajectory, gravity could be restored to its original value causing the ball to acquire more velocity than it gained upon the original descent. Repeating this process implies that there is no theoretical limit to the achievable altitude. Likewise, the movement of a ball bouncing wildly could be dampened.

Electromagnetic Analogue

A simple thought experiment can validate the basic principles the present technology relies upon. It is possible to make a projectile that responds to a magnetic field capable of splitting in two at precise attitudes (opposites). It could be an explosive charge like a firecracker, or any other method to separate by propulsion the two halves in the desired direction.

This projectile could be fired toward a magnetic source which will affect the trajectory. In this circumstance, it is possible to point the projectile close to the magnet but not directly at it and the projectile will strike the magnet. If the projectile doesn't strike the magnet, but comes very close, the magnet will deflect the course of the projectile, curving the trajectory towards it.

If identical trajectories are applied to the projectile, then the same behavior will be observed. If the projectile splits in two at any stage during its course, the two elements of the projectile cannot be deflected as much as if they remained together.

If the elements are tied together with a piece of string, they will still be less deflected by the magnet than if they were not separated at all.

The present technology is analogue to this example because magnetic fields have the same inverse square proportionality to gravitational fields.

Weight, Mass and Acceleration

Analyzing theoretical structures proportionally large relative to the gravitational body they are influenced by is helpful to visualize how the force of gravity is distributed. If an extraordinary large pair of balance scales are imagined sitting on a simple digital scale, it can be seen that the weight of the balance scales read on the digital scale will depend on the horizontal width of the top bar of the balance scales. As the top bar becomes wider, the weight on the digital scales reduces despite identical mass (if the width is adjusted larger on a live structure, work is done). The trays of the balance scale are also pulled inwards in slightly opposite directions, so they can be seen to be applying a compressive force to the top bar on top of the opposing cantilever forces the top bar resists. The decrease in weight is related trigonometrically to this compressive force.

If the chains holding the balance scale trays yielded, they would be seen accelerating at the same rate but in converging directions. The scale trays could strike each other on the way down (by somehow having a form that envelops the base) which demonstrates a horizontal acceleration. The energy of this strike is also related trigonometrically to the energy dissipated when the trays finally reach the ground.

Importantly, the combined acceleration in the overall (the combined body) downward direction (parallel to the balance scales' vertical center line) of the trays becomes lower as the top bar of the balance scales is made larger.

Directional and Positional Control

A limited but useful amount of directional control is available by two methods—changing the mass balance between the two masses and varying the attitude of the separation vectors.

Positional control refers to the intended destination which will govern the headings of the directional control. Positional destination also needs to be defined with a velocity and a heading.

To consider the effect of these two directional control strategies, the problem of positional control needs to be understood with acknowledgement of the challenges of navigation in space compared to navigation on Earth. The most significant aspect of this is the fact that all destinations in space should be considered moving unless you're anchored to the same body as your destination (even then this can't be said arbitrarily). Making a safe rendezvous requires two bodies to meet at velocities within the material limitations of the contacting structures.

Operation of the present technology for the purpose of gaining altitude (directional control) is best achieved with propelled mass trajectories perpendicular to the gravitational field. This context of usage is described by three trajectories—those of the two propelled masses and that of the central structure coupling the mass retention cables together with the payload, definable as the central apparatus load. The propelled constrained masses with insignificant central apparatus load will follow two ellipses with mirrored orbital planes. Interaction with the central load limits the extent of these ellipses and will produce compound elliptical trajectories defined by the positions of the three parts of the apparatus.

The two propelled masses would rendezvous in the mid phase of their respective orbits if they were set on these courses and not perturbed aside from by the effect of gravity. In this situation, with enough length coupling the two masses together, no tension in the cables needs to be resisted because the masses trajectories diverge. The masses will converge slower than their initial forced divergence due to the lower velocities on the slow sides of the ellipses. To gain more altitude, the masses need to be coupled together at their first trajectory intersection following separation until the apparatus reaches near the vicinity of maximum velocity. The immediate effect of coupling at the first intersection is restoring the gravitational effect to its maximum, causing a more elliptical trajectory to be followed, accelerating faster towards the gravitational body than if the masses dodged or bounced off each other. As earlier described, this cycle is repeated until the desired altitude is achieved at the orbit perigee.

The effective gain in altitude has an effect of lengthening the orbital period of the spacecraft. This aspect of the possible trajectories allows the spacecraft to wind back its own orbital period to closely synchronies with another orbiting body (sharing similar orbital energy) allowing for a gentle rendezvous.

A motion simulation (drawing 3, FIG. 5i, ii, iii, iv) of an apparatus transitioning to an orbit of greater eccentricity and magnitude yields an elevation of about 6 Km from an initial orbit 7000 Km from the center of the Earth, or a little over 600 Km above the Earth's surface using mass displacement of 425 Km (950 Km total) with an initial acceleration of about 250 $ms^{-2}$ for 2 seconds. This potential is somewhat illusory because the velocity of the apparatus is lower at this position. The period of the orbit is increased by $\frac{1}{550}$, meaning that after the initial separation leaving the masses unperturbed aside from by the force of gravity, after 550 orbits, the apparatus will rendezvous with another body traversing from the same initial orbital position of the apparatus.

Symmetric Elevation and Period Simulation

The most simple mode of operation of an Anti-Gravity Drive is simulated in these diagrams. Tie blue bodies represent the initial apparatus orbit prior to mass separation and provide a gauge to illustrate the change in orbital period and elevation of the separated masses, represented by the white bodies. The direction of travel is counter-clockwise.

This simple operation can be accomplished without providing a retraction force because the separated masses diverge and converge periodically.

This simulation is near to scale aside from the masses which for illustrative purposes are 160 Km in diameter relative to the scale. The white bodies are emitted with identical horizontal velocity and the blue bodies have an added vertical (north south) velocity component. The directed mass separation provides an increase in velocity from 7,546 ms−1 to 7,547.6 ms−1, about 1.6 ms−1, or 5.7 Kmh−1.

Figure 5I:
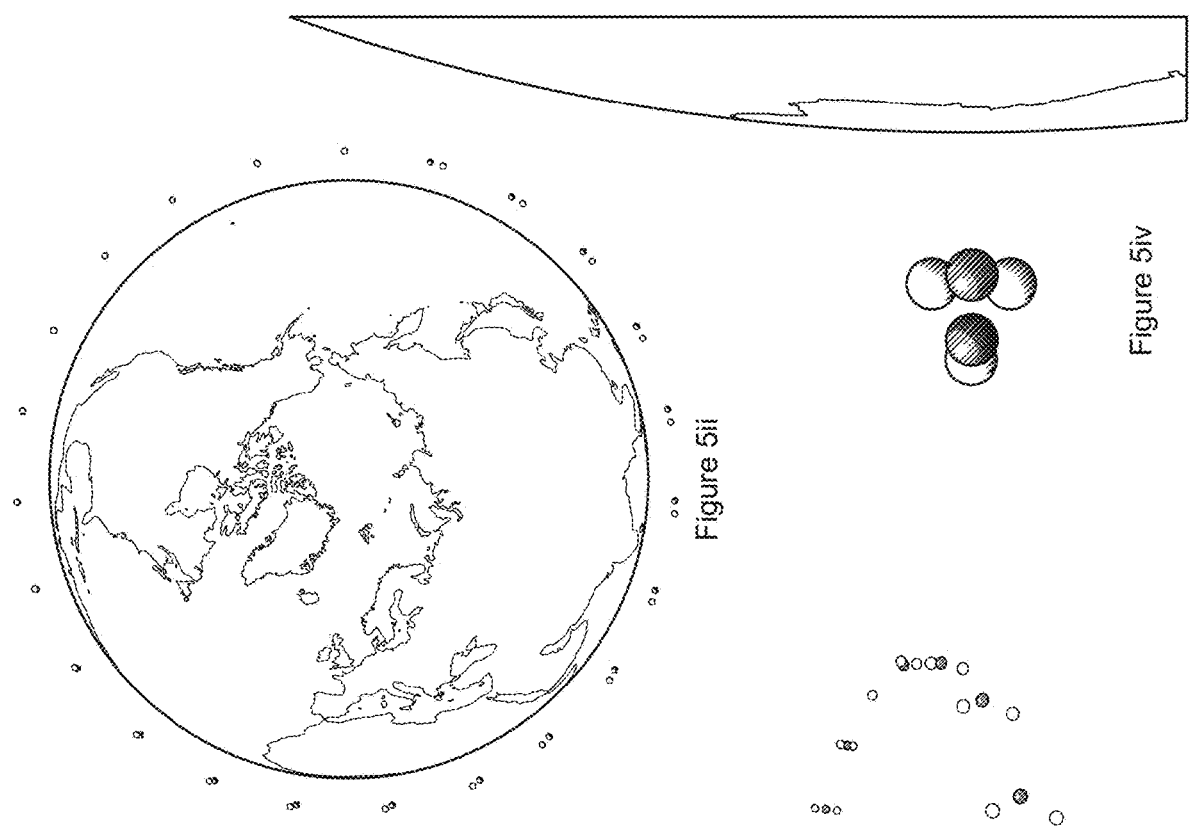
Figure 5I:
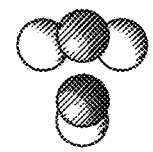
Figure 5I:
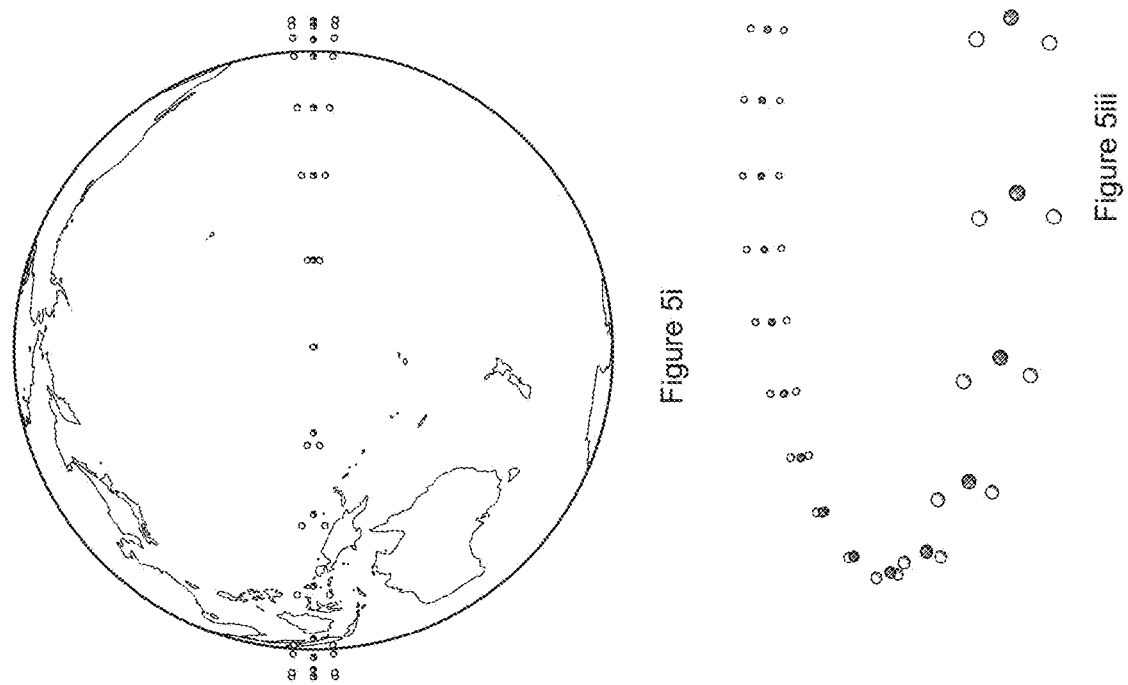

Maximum separation of about 950 Km occurs as the white bodies pass through the minor axis of their orbital ellipse. Maximum elevation of 6 Km above the circular orbit of the blue bodies occurs at the apogee. The orbital period of the blue bodies is about 98 minutes and the orbital period of the white bodies is about 98 minutes and ten seconds. FIG. 5i-iv show the relative positions at the end of the third orbit.

Orbital Planes and Vertical Transitions

Operating the present technology for the purpose of maneuvering into different orbital planes is possible and can be controlled by manipulating the initial attitudinal vectors of the propelled masses. When the altitudinal vectors are directed with oblique headings compared to the overall trajectory of the spacecraft and the gravitational field, the resultant compound trajectories will be asymmetric. The major axis of the constituent ellipses will not be shared. The two propelled masses would not rendezvous in the mid phase of their respective orbits if they were set on these courses and not perturbed aside from by the effect of gravity.

Given this scenario, there are points in the orbital cycle where one of the propelled mass' orbital plane is less aligned with the spacecraft's orbital plane than the other propelled mass' orbital plane. In addition, the trajectory velocities can be disproportionate, meaning that upon retraction of the masses following separation, the orbital plane may change. Upon retraction of the masses, a small amount of energy is withdrawn from the system representing the loss of velocity and a shift in the orbital plane. This aspect is described further in the simulation described on Drawing 4, FIGS. 6i-6iv.

Verticality in this Simulation Refers to the North South Direction.

This near scale simulation depicts the result of providing the directed masses with disproportionate velocity propelled in directions orthogonal with neither the trajectory or the gravitational field. The direction of travel in this simulation is clockwise. The masses are emitted in a series at regular intervals to show position relative to time.

Disproportionate velocity is imparted on the masses by altering the mass balance between the masses. The heavier masses are represented by the white bodies and the lighter masses are represented by the blue bodies. The blue bodies are 99.95% of the mass of the white bodies.

This modification of mass aligns the orbital period allowing the white and blue bodies to rendezvous in their initial position while experiencing significantly different gravitational trajectory deviation.

Major and minor axis of the white and blue bodies are shown to be significantly offset. The white and blue body orbital planes can be visualized and the initial orbital plane of the bodies prior to separation is purely horizontal.

Analysis of the orbital ellipses identifies vertical transition points—points where the directed mass vectors transition from downward motion to upward motion. At these transition points, the vectors are aligned with the horizontal axis. The vertical transition points are offset by 3.5° each in opposite directions, so a total of 7° offset exists between the blue and white orbital trajectories following separation.

The relative orbital periods cause the offset to be reduced to about 1°, but the diagram show's the first white body of the series advancing beyond its vertical transition (green sphere) point compared to the first blue body of the series emitted at exactly the same time which at this moment in time has not intercepted its own transition point (blue sphere).

Importantly, the improportionate separation movement creates a situation when one body color has zero vertical momentum and the other has a non-zero value. Retracting the directed masses at these points consolidates the momentum in a direction that has a non zero vertical component thus is not aligned with the initial orbital plane.

The exact orbital positions whereby the maximumal vertical velocity components can be created may not be at the vertical transition points, the purpose of this simulation is to provide a situation where simple numerical analysis can prove that manipulation of the apparatus orbital plane is possible by providing an instance where the consolidation of momentum includes zero as one of the factors.

The separation distance observed on the vertical transition interception is quite large which gives an indication of the difficulty of manipulating the orbital plane of an apparatus bearing an Anti-Gravity Drive.

It is also the case that any variation of mass balance between the two propelled masses will cause the resultant elliptical trajectories of the masses to be different. In the case of attitudinal initial vectors perpendicular to the gravitational field and the spacecrafts trajectory, a variation of mass will diminish the elevation potential and the mass with the lower induced velocity will arrive at the mid phase orbital intersection slightly earlier. The two elliptical trajectories in this case share their major axis, but not their minor axis. Because the two masses were directed with the same energy and share a major axis, the spacecraft orbital plane would remain unchanged.

In the case of attitudinal initial vectors not perpendicular to the gravitational field or the spacecraft's trajectory, a variation of mass will affect the ellipses proportionately.

A dilemma for operating trajectories outside the ideal perpendicularity to the trajectory is the effect of induced rotation. The flip side of this is a feature of the present technology. Retracting the two masses when their initial trajectories don't intersect will lead to induced rotational energy and potentially a lot of this, which can be converted into mass separation. However, there are instances in the cycles where the rotational moment between the two masses disappears (apparently twice with the rotational moment reversing beyond zero somewhat) and retraction is possible with a minimized rotational moment of inertia.

This capability allows satellites requiring reaction motors to be assisted with an appropriately sized orbital propulsion system to correct the cumulative rotational motion that causes reaction motors to become saturated with rotational velocity to the motors limits and no longer functional.

If the trajectories the masses are propelled along reside within a plane defined by the spacecraft trajectory and the gravitational field and are parallel with the apparatus trajectory (forwards and backwards), rotation will likely be induced upon retraction of the masses. In the case of propelled mass attitudes perpendicular to the apparatus trajectory, energy will be withdrawn due to the masses invariably accelerating away from each other when separated. Rotation will be induced under these circumstances. The orbital periods will be at their maximum difference at an angle between these two circumstances where one of the propelled masses is directed downwards and backwards, so the maximum proportion of orbital velocity may be cancelled out. The effect of this would be decent of the spacecraft through withdrawal of kinetic energy. Most instances of these circumstances will lead to rotation, although the rotational moment can disappear and reverse in specific positions. As mentioned earlier, gravitational tension has an influence on rotating elongated bodies with rotation motion eventually disappearing to be replaced with pendulum like oscillation.

The physical response of the masses to the deceleration strategy at the extent of separation is important for directional control. Careful design is needed to ensure both elastic and inelastic responses are available. If the intention of operation is intended to withdraw energy, an inelastic response is required so the masses don't spring back together. This is accomplished by controlling the tension of the retaining connections such that the tension is reduced to as close to zero as possible prior to maximum desired separation and that the compressive force induced upon retraction is reduced to zero by the time the masses fully decelerate. If it is desirable to retain the kinetic energy and simply reflect the mass velocity vectors by some type of spring action, then the elastic reactions should be optimized.

The range of orbital trajectories available to an individual apparatus possessing the present technology is limited to a series of ellipses evolved or devolved from or to a circular orbit with a particular energy level and period. This limit can be overcome by using two spacecraft that interact. Two bodies with at least one possessing the present technology can work off each other to boost each of their orbital energy quanta. An apparatus bearing the present technology is capable if winding back (or forward if the initial spacecraft orbital trajectories have an eccentricity between zero and one, i.e. Elliptical) its own orbital period and adjust its orbital plane, thereby enabling this apparatus to rendezvous gently again with the other body after an initial forceful oppositional action had repelled the other body. This process can be repeated indefinitely, enabling efficient propulsion without expending propellant.

Conservation of Angular Momentum

Conservation of angular momentum applies when there is no translation of the masses via separation or retraction. During the separation and retraction phases, the angular momentum of each of the masses increases with the addition of kinetic energy. Tire scalar sum of the angular momentum energy values of the two accelerated masses exceeds the original scalar sum prior to separation or retraction. In limited circumstances, one of the masses may lose angular momentum upon separation or retraction. This can happen if the applied force causes one of the masses to lose velocity, however, overall, the separation and retraction accelerations add energy to the system. When the masses are halted following separation or retraction, the angular momentum of the individual masses is reduced. The excess energy can be either captured by controlled deceleration or reinvested via an elastic reaction such as a bounce or spring back due to tension.

Restoring the apparatus to its original orbit requires restoring the original angular momentum value at the original elevation.

INDUSTRIAL APPLICATION

The most likely initial application of the present technology will be for use in spacecraft designed to service and position satellites, or aboard the satellites themselves to assist the reaction motors in retaining correct attitude and limited course adjustments. A pair of spacecraft with at least one bearing the present technology can be designed to be capable of working off each other to rendezvous with any orbiting body This means a payload can also be positioned in orbit or directed towards the dominant gravitational body or away from it towards a secondary gravitational body, say the moon from the Earth or vice versa.

Spacecraft will not be entirely propelled by the present technology—rocketry and other similar propulsive technologies are anticipated to be required for minor course adjustments or unplanned maneuvers. Reaction motors and gyroscopes will also be required to assist with attitude adjustment and to temporarily store surplus rotational energy.

Interactions between spacecraft and payloads that require more force than simple connection or bounces via gentle rendezvous can be accomplished by using tethers with automatic coupling devices. Tethers would be stretched out like spider web filaments used by baby spiders to carry them with the wind arid then be caught on an object with the intent of finding its own territory. The further a web filament stretched out, the more likely the swept path of the filament will intersect with another object.

In a similar way, tethers between spacecrafts and payloads can be directed to intersect and thereby couple across large distances. Couplable tethers will work for a range of divergent trajectories, however, if the trajectories' divergence exceeds the capability of the tethers and coupling mechanisms, the tethering system will fail. As the tethers collide, there also is the possibility of them tearing through each other because of a massive difference between velocity vectors typically experienced with space travel.

The tethering system thereby needs to be made robust enough to be useful and handle considerable tether collisions for successful coupling.

With substantial enough tethers and coupling systems, it may be possible to collect sub orbital capable spacecraft and bring them into orbital trajectories.

Decoupling

Decoupling requires some force to be applied to separate two orbiting bodies. Small amounts of decoupling force can be obtained by direct shove off using a variety of methods including linear motors, explosive expansion, or even by severing a tensile connection between the two bodies.

To decouple in a way that creates large velocities, complex expansion mechanisms similar to the embodiments (3 and 4) described can be used. The drawback for this type of decoupling method is the large inertial forces that would need to be applied which may not be survivable by crew inhabiting either of the vessels.

To obtain the types of velocities useful for navigating space and not endangering crew, the inertia needs to be generated slowly. This means that higher velocities require more distance for the decoupling force to be applied, meaning the bodies need to be in "contact" over this entire distance. Obviously, motion derived this way does place the two centers of mass on a collision course, but collision can be avoided with appropriate design, most typically if one of the bodies has a void in the place of the center of mass, like a toroid or boomerang shape.

Tethers can be used as a "runway" and can be very long. By interspersing magnets or magnetic materials 9 along a tether, it is possible for a body to traverse along the tether by using controlled magnetic fields. In this instance, the tether and the body together form a linear motor. The design of such a system would need to be able to prevent or substantially limit actual physical contact because the velocities intended would be substantial, meaning a failure of the decoupling system could be catastrophic.

Orbital Network

It is envisaged that the implementation of the present technology will see the space above Earth and elsewhere controlled mainly by spacecraft bearing such drives cooperating in a network. Rocketry will be used for situations where the present technology is impractical and vice versa. As the network population increases, the responsiveness of the network also increases—movements of payloads can be more quickly performed because there will be closer proximity due to a multitude of nodes.

With sufficient nodes to the network it is thereby possible to maintain a relatively geocentric position of another body at much lower altitudes than required for a geocentric orbit. This would be accomplished by periodically transferring orbital inertia generated by the present technology network to the body requiring the periodic provision of lift—individual nodes traversing by the other body would singularly pass on their inertia thereby providing lift one after the other to periodically negate the force of gravity on the body. This attribute of such a network would allow for rendezvous of sub-orbital aircraft or even allow the geocentric positioning of a Space Elevator.

The final result can be visualized as operating like a complex mobile space trapeze act enabling efficient mastery of proximate space.

EMBODIMENTS

The minimum embodiment of an apparatus capable of elevating itself consists of two retained masses and retaining mechanisms that embody the capability to create opposing forces between the retained masses that impose separation and retraction of the masses.

Figure 7:
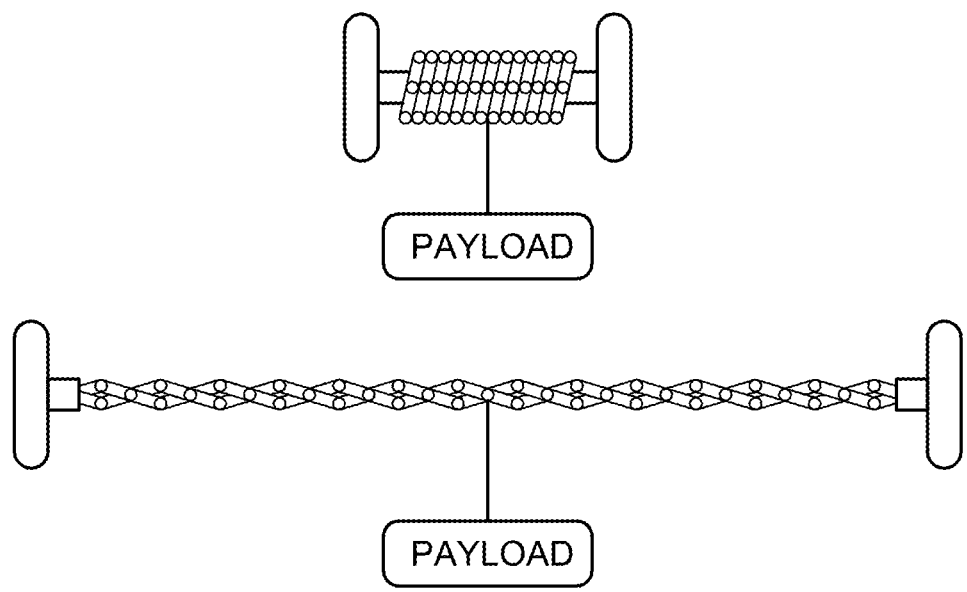
FIG. 7 is a front view of an embodiment of the present technology utilizing structural members within a repeating scissor lift type configuration in an extending and retracted positions.

Embodiment 1 (drawing 5, FIG. 7) proposed uses structural members within a repeating scissor lift type configuration. While limited in terms of the scale of its separation distance, the rigidity allows for the separated state to be held at the maximum value for as long as required.

Figure 8:
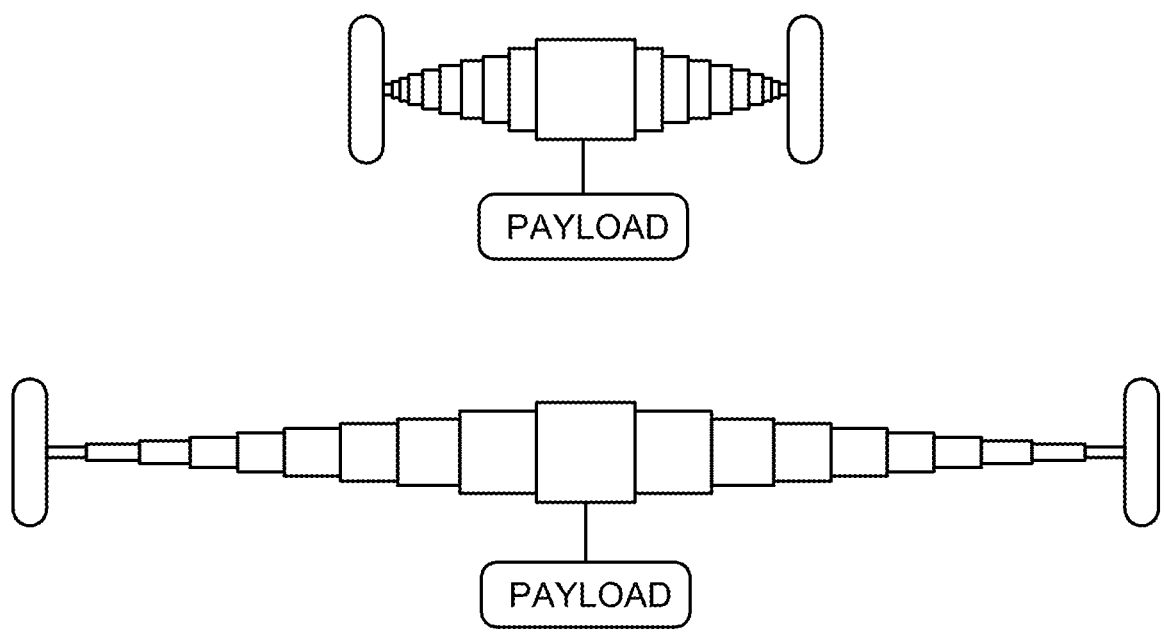
FIG. 8 is a front view of an embodiment of the present technology utilizing telescopic segmentation to perform separation and retraction in an extending and retracted positions.

Embodiment 2 (drawing 5, FIG. 8) proposed functions in much the same way as the first embodiment possessing the same attributes enabled through rigidity. This embodiment uses telescopic segmentation to perform separation and retraction.

One drawback for rigid embodiments is the effects of micro gravity which tends to pitch orbiting structures vertically. This effect can be corrected for with gyroscopic stabilizers, however with large separation distances, micro gravity forces may require substantial effort to correct this pitching effect.

A more useful variant may be embodiments designed to augment a simple tether type physical limiting device to retain the masses incorporated with a central component that provides a location for the attachment of a payload. This embodiment class utilizes explosive forces generated chemically, or alternatively by applying electromotive force via an electrical rail gun or similar electromagnetically powered acceleration device. The embodiments described are intended to use the explosive force of combusting hydrogen with oxygen because reversal of the chemical reaction is a simple process requiring minimal componentry.

The advantages of utilizing tethers to provide a physical connection between the two masses and the payload is the ability to span large separation distances, thus greater gravitational vector manipulation is achieved. Micro gravity forces have less effect on the apparatus compared to rigid embodiments because there is practically no propagation of gravitationally induced bending moments that cause rotation, so less positional and/or rotational rectification is required.

Rather than holding their separated position, these embodiments cycle between separation and retraction, meaning the effective gravitational force is a function of the average mass separation distance if the cycles are substantially more frequent than the orbital period. To calculate precise trajectories, the vector sum of the gravitational force operating throughout the respective cycle as well as the slight divergence of the two masses away from opposite headings in response to interacting with the payload assembly need to be evaluated.

Increasing the overall mass, the separation distance capacity and increasing transition velocities provide for optimized performance. The first two factors define capacity and the transition velocities in relation to the distance capacity defines responsiveness. Tire ability to transfer mass between the main components for trajectory manipulation is achievable by including piping with the cables, otherwise shifting mass between components is easily achievable through other means prior to separation. A highly useful way of transferring mass would be transferring a flywheel undergoing significant rotation between the main components, allowing rotational kinetic energy to be exchanged between the main components without requiring the components to be rotated in opposition to each other.

Figure 9:
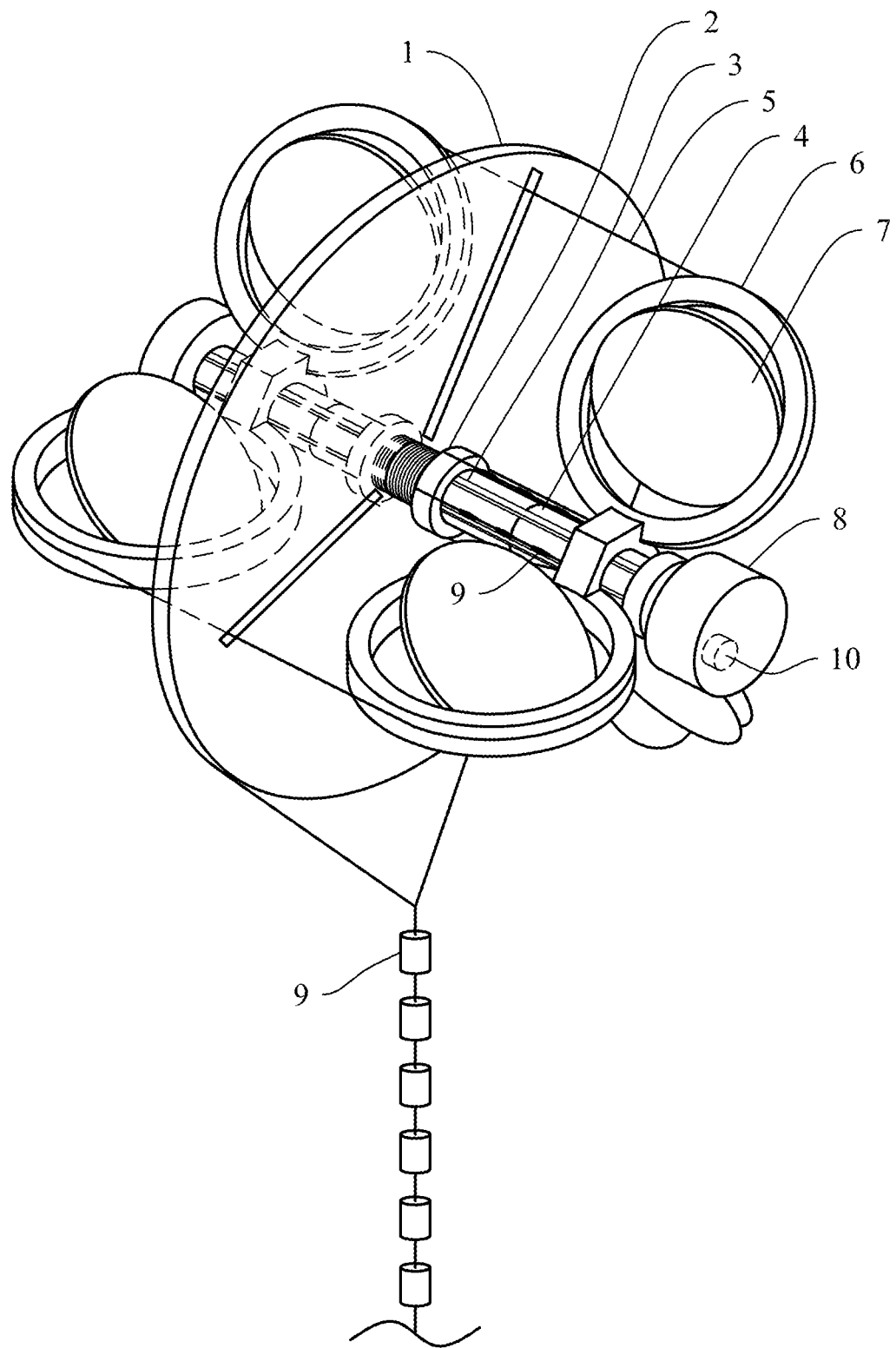
FIG. 9 is a perspective view of an embodiment of the present technology utilizing the payload assembly, the propellable masses, the reel assemblies and the binding mechanism.

Embodiment 3 utilizes a yo-yo type action for efficient transmission and conversion of forces. Drawing 6 FIG. 9 illustrates the main components of embodiment 3, their purpose. are described herein:

1: Payload Assembly—Consists of a large pulley containing a bearing race supporting a reel to allow the two sides to rotate relative to the payload cable. The payload cable assembly can also be made to adjust the elevation of the payload to assist in controlling the overall heading and to make payload docking easier.

2: Tail Force Absorber Assembly—Transmits the force from the halting of the projectiles to the opposing side. Assembly consists of a dynamically locatable cylinder that slides along the main barrel to increase the duration of the force exchanges, thus minimizing stresses throughout the apparatus. A force absorber made of a shock absorbing material such as rubber is located at the end of the assembly to extend the du ration of the force exchanges between the respective projectile and the rest of the apparatus.

3: Reel Assembly Rails—Rails are positioned by retainers at each end. Allow the reel assemblies to travel between the retainers in a controlled manner with springs or driven ballscrews. Lubrication shield may be included to prevent lubrication evaporation.

4: Projectile—Initiate the opposing motion of each side. The projectiles possess substantial mass and are propelled towards the opposing side with explosive force from the propellant.

5: Cables—Three cables connect the two sides and pass through the payload assembly pulley. Slots in the pulley allow the cables to reposition relative to the pulley depending on the direction of the cable reel. A sliding bushing (not detailed) protects the cable from damaging itself on the pulley slots and enables smooth motion back and forth along the slot.

6: Reel Assemblies—Three circular structures each contain a reel and ball race assembly on each side of the apparatus to allow rapid unreeling of the cable as the separation motion is engaged. Upon retraction, electric motors or configurations of electromagnetic devices reel in the cable. The reel assemblies also deliver expended propellant and solar generated electricity between the condensers and the main assembly. The reels allow a yo-yo type response to occur upon initiation of separation and at the point of full separation. The reel continues rotating after full separation enabling this kinetic energy to commence reeling in the cable.

7: Solar and Condenser Panels—Position controlled to allow revolution within the reel assemblies, panels have photovoltaic collectors that are positioned to capture full sunlight while the condenser is positioned on the opposite side and has enhanced surface area to radiate excess heat form the expended propellant. Timeline diagrams show the application of pressure resulting in an inflation of the condenser, although this aspect may not be required.

8: Control & Fuel Storage & Conversion Enclosure—Of arbitrary size, this enclosure houses controls and communications equipment for the apparatus as well as battery storage, fuel component storage and compressing/pumping equipment 10, hydrolysis equipment, additional gyroscopic stabilizers etc.

Operation is described via timeline renderings (Drawing 7 FIGS. 10i-v and drawing 8 FIG. 10 continued vi-x) showing approximate positions relative to a timeline of 360 frames. Drawings are not intended to be to scale, rather they are an indication of the rough proportionality of these embodiments excluding the maximum separation distance. Separation distances are expected to be much greater than what appears visually. The left hand sequence features partial cutaway views.

F000: Cables retracted, cables fully wound, reel assemblies swing cable through to the outermost position on the payload pulley slots (innermost every second cycle), tail stationary, rest of assembly slows to a halt aside from the projectile, propellant activated.

F002: Projectile accelerates due to activated propellant, main assembly accelerates in response to propel lent activation and a spring located on the payload assembly. The tail assembly may also be sprung to increase the acceleration of the main assembly. Reel assembly remains at a halt as it traverses along the reel assembly rails.

F005: Projectile reaches tail creating maximum pressure between the two sides, tail reaches its maximum extension from the main assembly while stationary. Main assembly accelerates further in response, subsequent cable tension causes the cable reels to commence rotating and releasing the cable. Cable reel assembly continues travelling along the cable reel assembly rails at increased velocity.

F010: Expended propellant discharged to the condenser panels with the assistance of the projectile recoil, main assembly accelerates in response, payload assembly spring ceases contact with the tail assembly. Cable reels accelerated to maximum rotational speed.

F055: Cable reel assemblies reach their limit along the main assembly providing a small boost to the diminishing rotational speed of the cable reels. Headings of the two sides diverge towards each other away from travelling in opposite directions as a response to the acceleration of the payload. This interaction defines the capabilities of the overall apparatus design relative to the desired payload.

F110: Cables reach their limit providing tension through an elastic response decelerating the entire main assembly.

F115: Cable reels continue spinning causing the cable to transit to the innermost position relative to the payload pulley assembly slots—this event embodies the action of a yo-yo when fully extended.

F240: Cable reel assemblies reach their innermost limit on the main assembly in a controlled manner in combination with motorized assistance to wind back the cable under appropriate tension to avoid any entanglement as the entire main assembly is drawn back towards the payload. Cable reel assemblies begin transiting towards the outer limit in preparation for full retraction.

F350: The two tail assemblies halt as they contact each other, and the payload springs contact the main assembly commencing deceleration of the main assembly.

F360: Main assembly reaches its limit relative to the tail, propellant is injected between the projectile and head side of the main assembly, cable reel assemblies reach their outermost limit relative to the main assembly.

The invention claimed is:

1. An orbital propulsion system comprising:
a payload assembly;
a pair of propellable masses couplable to the payload assembly and cyclically moveable in diverging and converging directions in relation to each other, wherein a mass of a first of the propellable masses is different to a mass of a second of the propellable masses;
a binding mechanism configured to physically constrain the pair of propellable masses;
a mass directing mechanism configured to control an attitudinal orientation of the propellable masses; and
a control system configured to:
 alter a spatial mass distribution of the propellable masses to reduce a gravitational deviation of a trajectory of the payload assembly for providing a resultant propulsive force to the payload assembly;
 accelerate the propellable masses in directions toward an outer extent of the binding mechanism, respectively, wherein the directions being angled with a gravitational field of a gravitational body, and to positionally direct the propellable masses to determined first positions or first regions that reduce the gravitational deviation of the trajectory of the payload assembly; and
 accelerate the propellable masses in directions toward an inner extent of the binding mechanism to increase the gravitational deviation of the trajectory of the payload assembly for restoring an initial state of the payload assembly that experiences increased gravitational deviation or to create a state of increased gravitational deviation, and to positionally direct the propellable masses to determined second positions or second regions that increase the gravitational deviation of the trajectory of the payload assembly;

wherein each of the propellable masses being propelled by a propellant to accelerate the propellable masses toward the outer extent of the binding mechanism;

wherein a payload being contained in any one of or any combination of the payload assembly, and the propellable masses.

2. The orbital propulsion system according to claim 1, wherein the control system includes any one or any combination selected from the group consisting of a gyroscope configured to provide gyroscopic action, reaction motors, and reaction inducers, for controlling the attitudinal orientation of the mass directing mechanism and the propellable masses.

3. The orbital propulsion system according to claim 1, wherein each of the propellable masses include a mass propelling device configured to accelerate the propellable masses toward the inner extent of the binding mechanism, the mass propelling device being selected from the group consisting of a transduction component, an electromagnetic force component, and a chemical reaction component configured to generate a propelling force.

4. The orbital propulsion system according to claim 1, wherein the binding mechanism includes a tether coupled to and extending between the propellable masses, and wherein the tether is extensible and retractable.

5. The orbital propulsion system according to claim 1, wherein the binding mechanism is one or more cables windable about a reel assembly associated with each of the propellable masses, the real assembly is configured to wind in or let out the cables, respectively.

6. The orbital propulsion system according to claim 5, wherein the payload assembly includes slots configured for passage of at least one of the cables therethrough.

7. The orbital propulsion system according to claim 6, wherein the propellable masses each includes a reel assembly rail slidably associated with the reel assembly, with the propellable masses each being mounted to the reel assembly rail, respectively.

8. The orbital propulsion system according to claim 7, wherein the reel assembly rail includes a projectile configured to be propelled toward the reel assembly and to accelerate the propellable masses in the directions toward the outer extent of the binding mechanism.

9. The orbital propulsion system according to claim 7, wherein the payload assembly includes a tail force absorber assembly configured to absorb an impact force of the reel assembly rail.

10. The orbital propulsion system according to claim 5, wherein the reel assembly includes a photovoltaic collector.

11. The orbital propulsion system according to claim 10, wherein the photovoltaic collector is associated with a panel revolvable within the reel assembly, and wherein the panel includes a condenser on a side opposite the photovoltaic collector, the condenser being configured to radiate heat resulting from a mass propelling device of the propellable masses.

12. The orbital propulsion system according to claim 1 further comprising a mass transfer system configured to control and transfer mass between elements of the orbital propulsion system to provide control over velocity responses of the propellable masses and the payload assembly to an application of forces, the mass transfer system being selected from the group consisting of a fluid pump, a gas pump, and a moveable solid mass.

13. A method of using an orbital propulsion system that utilizes mechanical energy exerted on constrained masses within gravitational fields to modify a trajectory of a spacecraft, the method comprising the steps of:

directing a pair of propellable masses towards locations or regions where disproportionate gravitational deviative forces cause disproportionate inertial reactions of the propellable masses that are applied to a payload assembly of the spacecraft, wherein the propellable masses are physically constrained to each other by a binding mechanism, and wherein a mass of a first of the propellable masses is different to a mass of a second of the propellable masses;

altering an initial trajectory by decelerating the spacecraft for any one of or any combination of lowering velocity and causing the spacecraft to enter trajectories that exist on different orbital planes than the initial trajectory; and manipulating an orbital period by directing the propellable masses towards locations or regions that lengthen or shorten the orbital period of the spacecraft in response to the inertia applied by the propellable masses by:

propelling each of the propellable masses by a propellant to accelerate the propellable masses in directions toward an outer extent of the binding mechanism, respectively, wherein the directions being angled with a gravitational field of a gravitational body, and to positionally direct the propellable masses to determined first positions or first regions that reduce the gravitational deviation of the trajectory of the payload assembly; and accelerating the propellable masses in directions toward an inner extent of the binding mechanism to increase the gravitational deviation of the trajectory of the payload assembly for restoring an initial state of the payload assembly that experiences increased gravitational deviation or to create a state of increased gravitational deviation, and to positionally direct the propellable masses to determined second positions or second regions that increase the gravitational deviation of the trajectory of the payload assembly.

14. The method according to claim 13 further includes the step of transferring mass between elements of the spacecraft utilizing a mass transfer system selected from the group consisting of a fluid pump, a gas pump, moveable reservoirs, and a moveable solid mass.

15. The method according to claim 13, wherein each of the propellable masses include a mass propelling device configured to accelerate the propellable masses toward the inner extent of the binding mechanism.

* * * * *